(12) United States Patent
Balasubramanian et al.

(10) Patent No.: US 7,668,078 B2
(45) Date of Patent: Feb. 23, 2010

(54) ALLOCATION OF WALSH CODES TO SUPPORT CALLS IN WIRELESS COMMUNICATION NETWORKS

(75) Inventors: Srinivasan Balasubramanian, San Diego, CA (US); Rath Vannithamby, San Diego, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 766 days.

(21) Appl. No.: 11/074,255

(22) Filed: Mar. 7, 2005

(65) Prior Publication Data

US 2005/0232142 A1 Oct. 20, 2005

Related U.S. Application Data

(60) Provisional application No. 60/550,399, filed on Mar. 5, 2004.

(51) Int. Cl.
*H04J 11/00* (2006.01)
(52) U.S. Cl. ....................................... 370/209; 370/330
(58) Field of Classification Search ................ 370/335, 370/342, 209, 328, 329, 330, 338
See application file for complete search history.

(56) References Cited

U.S. PATENT DOCUMENTS

| | | | | |
|---|---|---|---|---|
| 5,943,331 A * | 8/1999 | Lavean | ........................ | 370/335 |
| 6,317,413 B1 * | 11/2001 | Honkasalo | .................. | 370/209 |
| 6,473,395 B1 | 10/2002 | Lee | | |
| 6,690,714 B1 * | 2/2004 | Iwamatsu et al. | ........... | 375/148 |
| 6,707,788 B1 * | 3/2004 | Kim et al. | .................... | 370/203 |
| 6,944,449 B1 * | 9/2005 | Gandhi et al. | ................ | 455/425 |
| 7,075,885 B2 * | 7/2006 | Thorson et al. | ............. | 370/209 |
| 7,133,462 B2 * | 11/2006 | Ha et al. | ..................... | 375/295 |
| 7,324,578 B2 * | 1/2008 | Kwon et al. | ................. | 375/135 |
| 2003/0039204 A1 | 2/2003 | Tiedemann | | |
| 2003/0063595 A1 * | 4/2003 | You et al. | .................... | 370/342 |
| 2003/0103480 A1 * | 6/2003 | You et al. | .................... | 370/335 |
| 2003/0147454 A1 * | 8/2003 | Kwon et al. | ................. | 375/146 |
| 2005/0002529 A1 * | 1/2005 | Vannithamby | .............. | 380/255 |
| 2005/0195759 A1 * | 9/2005 | Hosein et al. | ............... | 370/310 |
| 2005/0232142 A1 * | 10/2005 | Balasubramanian et al. | .......................... | 370/209 |
| 2006/0068717 A1 * | 3/2006 | Gandhi et al. | ............ | 455/67.13 |
| 2007/0263586 A1 * | 11/2007 | You et al. | .................... | 370/342 |

FOREIGN PATENT DOCUMENTS

EP 1189375 10/2002

* cited by examiner

*Primary Examiner*—Ricky Ngo
*Assistant Examiner*—Christine Ng
(74) *Attorney, Agent, or Firm*—Coats & Bennett, P.L.L.C.

(57) ABSTRACT

Methods and apparatus for allocating Walsh codes to support wireless connections over fundicated and supplemental channels are disclosed. In an exemplary embodiment, a Walsh code for an incoming call is selected from a first group of Walsh spaces if any of those Walsh spaces is capable of supporting the incoming call, and selecting a Walsh code from a second group otherwise. If the Walsh space from which the Walsh code is selected is from the second group, it is marked with a time stamp. The disclosed techniques reduce fragmentation in the overall Walsh space caused by random connection and disconnection from the wireless network.

23 Claims, 5 Drawing Sheets

| | FIG. 4A | | FIG. 4B | | FIG. 4C | | FIG. 4D | |
|---|---|---|---|---|---|---|---|---|
| WS1 | 2 SCH CALLS | TF=0 TS=T3 | | TF=0 TS=T3 | | TF=0 TS=T3 | | TF=0 TS=T3 |
| WS2 | 2 SCH CALLS | TF=0 TS=T4 | 2 SCH CALLS | TF=0 TS=T4 | 2 SCH CALLS | TF=0 TS=T4 | 2 SCH CALLS | TF=0 TS=T4 |
| WS3 | 2 SCH CALLS | TF=0 TS=T5 | 1 SCH CALL | TF=0 TS=T5 | 1 SCH CALL | TF=0 TS=T5 | 1 SCH CALL | TF=0 TS=T5 |
| WS4 | | TF=0 TS=0 | | TF=0 TS=0 | | TF=0 TS=0 | | TF=0 TS=0 |
| WS5 | | . | | . | | . | | . |
| WS6 | | . | | . | | . | | . |
| WS7 | | . | | . | | . | | . |
| WS8 | | . | | . | | . | | . |
| WS9 | | . | | . | | . | | . |
| WS10 | | . | | . | | . | | . |
| WS11 | | TF=0 TS=0 | | TF=0 TS=0 | | TF=0 TS=0 | | TF=0 TS=0 |
| WS12 | 4 FC CALLS | TF=T2 TS=0 | 3 FC CALLS | TF=T2 TS=0 | 4 FC CALLS | TF=T6 TS=0 | 1 FC CALL | TF=T6 TS=0 |
| WS13 | 4 FC CALLS | TF=T1 TS=0 | 2 FC CALLS | TF=T1 TS=0 | 2 FC CALLS | TF=T1 TS=0 | | TF=T1 TS=0 |
| WS14 | 2 FC CALLS | | 1 FC CALL | | 2 FC CALLS | | 2 FC CALLS | |
| WS15 | 2 FC CALLS | | 1 FC CALL | | 2 FC CALLS | | 2 FC CALLS | |
| WS16 | 2 FC CALLS | | 2 FC CALLS | | 2 FC CALLS | | 1 FC CALL | |
| WS17 | X | | X | | X | | X | |
| WS18 | X | | X | | X | | X | |
| WS19 | X | | X | | X | | X | |

| | FIG. 4E | | | FIG. 4F | | | FIG. 4G | |
|---|---|---|---|---|---|---|---|---|
| WS1 | | TF=0<br>TS=T₃ | | | TF=0<br>TS=T₃ | | | TF=0<br>TS=T₃ |
| WS2 | 2 SCH CALLS | TF=0<br>TS=T₄ | | 2 SCH CALLS | TF=0<br>TS=T₄ | | 2 SCH CALLS | TF=0<br>TS=T₄ |
| WS3 | 2 SCH CALLS | TF=0<br>TS=T₈ | | 1 SCH CALL | TF=0<br>TS=T₈ | | 1 SCH CALL | TF=0<br>TS=T₈ |
| WS4 | | TF=0<br>TS=0 | | | TF=0<br>TS=0 | | | TF=0<br>TS=0 |
| WS5 | | . | | | . | | | . |
| WS6 | | . | | | . | | | . |
| WS7 | | . | | | . | | | . |
| WS8 | | . | | | . | | | . |
| WS9 | | . | | | . | | | . |
| WS10 | | . | | | . | | | TF=0<br>TS=0 |
| WS11 | | TF=0<br>TS=0 | | | TF=0<br>TS=0 | | 2 FC CALLS | TF=T₁₁<br>TS=0 |
| WS12 | 4 FC CALLS | TF=T₇<br>TS=0 | | 3 FC CALLS | TF=T₇<br>TS=0 | | 4 FC CALLS | TF=T₉<br>TS=0 |
| WS13 | | TF=T₁<br>TS=0 | | | TF=T₁<br>TS=0 | | 4 FC CALLS | TF=T₁₀<br>TS=0 |
| WS14 | 2 FC CALLS | | | 2 FC CALL | | | 2 FC CALLS | |
| WS15 | 2 FC CALLS | | | 1 FC CALL | | | 2 FC CALLS | |
| WS16 | 2 FC CALLS | | | 2 FC CALLS | | | 2 FC CALLS | |
| WS17 | X | | | X | | | X | |
| WS18 | X | | | X | | | X | |
| WS19 | X | | | X | | | X | |

ALLOCATION OF WALSH CODES TO SUPPORT CALLS IN WIRELESS COMMUNICATION NETWORKS

RELATED APPLICATIONS

The present patent application claims priority under 35 U.S.C. § 119(e) from the following patent applications: (i) U.S. Provisional Patent Application No. 60/550,399 filed on Mar. 5, 2004 and entitled "Optimal Frequency of Walsh Mask Broadcast for Forward High-Speed Wireless Packet Data Channels" and (ii) U.S. patent application Ser. No. 10/994,844 filed on Nov. 22, 2004 and entitled "Optimal Frequency of Walsh Mask Broadcast for Forward High Speed Packet Data Channel". Both of these filed patent applications are expressly incorporated in their entirety by reference herein.

BACKGROUND OF THE INVENTION

The present invention generally relates to wireless communication networks, and particularly relates to the allocation of Walsh codes to support calls over circuit switched channels.

The Third Generation Partnership Project 2 (3GPP2), a partnership consisting of five telecommunication standards bodies, establishes Code Division Multiple Access (CDMA) standards for wireless communication networks. There are several established CDMA standards, two of which are IS-95 and IS-2000 or cdma2000. Wireless communication networks operable in accordance with IS-95 or IS-2000 Revisions A and B are capable of supporting (a) calls over dedicated channels such as fundamental channels and dedicated control channels and (b) calls over a supplemental channel (hereinafter "SCH"). As used herein, a fundicated channel ("FC") comprises a fundamental channel, a dedicated control channel, or both fundamental and dedicated control channels. FC calls are typically, but not necessarily, voice calls, and SCH calls are typically data calls having a data rate rarely exceeding 300 kbps. To satisfy the growing demand for high-speed wireless data services at rates beyond 300 kbps, IS-2000 revisions C and D were established and are backward compatible with previous revisions. Revisions C and D are also known as 1xEV-DV, referring to 1 carrier radio transmission technology Evolution for high speed integrated Voice and Data. In accordance therewith, a new channel—a Forward Packet Data Channel (hereinafter "F-PDCH")—is introduced to support high-speed wireless packet data transmission on the forward link from the network to the mobile station. As apparent from its name, the F-PDCH is a packet switched channel that can be used to support more than one mobile station. That is, the F-PDCH can be shared among a potentially large plurality of packet data users to provide high-speed packet data services to the users sharing such channel.

Because revisions C and D are backward compatible with previous revisions A and B, 1xEV-DV wireless communication networks are capable of supporting (1) traditional voice and data calls established over FCs and SCHs as well as (2) data calls established over a time shared high-speed packet data channel such as the F-PDCH. In practice, FC calls will have higher priority than SCH calls, which in turn will have higher priority than calls over the F-PDCH channel. Therefore, radio resources such as power and Walsh codes will be given to calls based on the following prioritized order: calls established over the FCs; calls established over the SCH and calls established over the F-PDCH(s). Although the SCH does operate in conjunction with the FC, SCH calls or calls over SCH as used herein are defined from the perspective of which channel will the allocated Walsh codes be used for coding. That is, if the network allocates a Walsh code to a call and such allocated Walsh code will be used for coding over a SCH, then such call is defined as a SCH call even though such SCH call also requires the usage of the FCs.

Regarding Walsh coding radio resources, Walsh codes from defined Walsh spaces are first allocated to calls established over the FCs and SCHs. Any leftover or unused Walsh codes can be used to support calls over the F-PDCH. For a given available transmit power, the maximum data rate achievable on the F-PDCH at any given instant depends on the number of Walsh codes available to it. Coding on the F-PDCH uses multiples, not necessarily contiguous, of length-32 Walsh codes from defined Walsh spaces. This coding approach is called multi-code CDMA, and the more codes available for multi-coding F-PDCH transmissions, the higher the achievable data rate.

Theoretically, the Walsh codes used for the F-PDCH can change every 1.25 ms, which is the "slot" timing of the F-PDCH, as the FCs and SCHs occupy more Walsh codes with the arrival of incoming calls or can abandon Walsh codes as current calls over such channels are disconnected from the network. Randomness in that arrival/departure process creates fragmentation in the Walsh spaces resulting in non-contiguous leftover Walsh codes of various lengths in such Walsh spaces. Such fragmentation can reduce the availability of length-32 Walsh codes for assignment to the F-PDCH.

SUMMARY OF THE INVENTION

The present invention provides an allocation scheme that effectively maximizes the number of Walsh codes available for supporting a high-speed packet data channel. For example, certain types of wireless communication networks use the same Walsh code resources to support high-speed packet data calls as are used to support other types of calls (e.g., circuit-switched voice and data calls, and lower-rate packet data service calls), with these other types of calls often being allocated Walsh codes at a higher priority. The prioritized allocation of Walsh codes to support incoming traditional voice and data calls can have an effect on the number of leftover Walsh codes available for potential use by the high-speed packet data channel, especially because fragmentation in the overall Walsh space is an issue as mobile users randomly connect and disconnect from the network, causing frequent changes in the overall Walsh code space.

Thus present invention generally focuses on how to allocate Wash codes that are available in a wireless communication network. In a cdma2000 embodiment, the present invention provides a method and apparatus efficiently supporting Walsh code allocations for calls established over the FCs, SCHs and F-PDCH(s). To do so, such available Walsh codes belong to Walsh spaces that are numerically identified from 1 to n. It should be noted that Walsh spaces could be numbered numerically from a first number to a second that is higher than the first number. Also, the first number does not necessarily have to be 1. For example, the Walsh space could be numerically identified from 0 to n or 5 to n and all such indexing variations fall within the scope of the present invention. Also, in this present application, "WS" is an abbreviation for the singular phrase "Walsh space" or the plural phrase "Walsh spaces".

To support FC calls, the network allocates Walsh codes from WS numerically identified from (m+1) to n until those Walsh spaces cannot support any additional FC calls and then the network allocates Walsh codes from WS numerically identified from 1 to m.

Regarding the allocation of Walsh codes from WS numerically identified from (m+1) to n, the network selects Walsh code(s) by starting with Walsh space n and moving toward Walsh space (m+1) until there is an available Walsh space capable of supporting FC call(s).

Regarding the allocation of Walsh codes from WS numerically identified from 1 to m, the network initially selects the Walsh code(s) by starting with Walsh space m and moves toward Walsh space 1 until there is an available Walsh space capable of supporting the FC call(s). Thereafter, each of the WS numerically identified from 1 to m is time marked with a current time if a Walsh code therein gets allocated to support either a FC or SCH call, wherein 1<m<n. The time field of each time marked WS gets updated if such time marked WS is later used to support another FC call. Once there are time marked WS, the network first selects Walsh codes from those WS that are time marked by starting with the WS having a time that is the most current and moving toward the WS having the time that is least current until none of the time marked WS can support any additional FC calls. Thereafter, the network selects the Walsh code(s) from those WS numerically identified from 1 to m that are not time marked by starting at WS m and moving toward WS 1.

As mentioned above, FC calls are prioritized higher than SCH calls and thus, the network first supports all incoming FC calls before it supports the incoming SCH calls. To support SCH calls, the network initially allocates Walsh codes from WS numerically identified from 1 to n by starting at WS 1 and moving toward WS n until there is an available WS to support the SCH(s). For each of WS numerically identified from 1 to m, such WS is time marked with a current time after such WS is first used to support a SCH call. The time field of each time marked WS gets updated if such time marked WS is later used to support another SCH call. Once there are time marked WS, the network first selects Walsh codes from those WS that are time marked by starting with the WS having a time that is the most current and moving toward the WS having the time that is least current until none of the time marked WS can support any additional SCH calls. Thereafter, the network selects the Walsh code(s) from those WS numerically identified from 1 to n that are not time marked by starting at WS 1 and moving toward WS n.

Based on the Walsh codes allocation scheme discussed above, the number of remaining Walsh codes that could be used to support F-PDCH calls are effectively maximized.

BRIEF DESCRIPTION OF THE DRAWINGS

Other objects and features of the present invention and many of the attendant advantages of the present invention will be readily appreciated and become better understood by reference to the detailed description when considered in connection with the accompanying drawings in which like reference numerals designate like parts throughout the figures thereof and wherein.

DETAILED DESCRIPTION OF THE INVENTION

Figure 1:
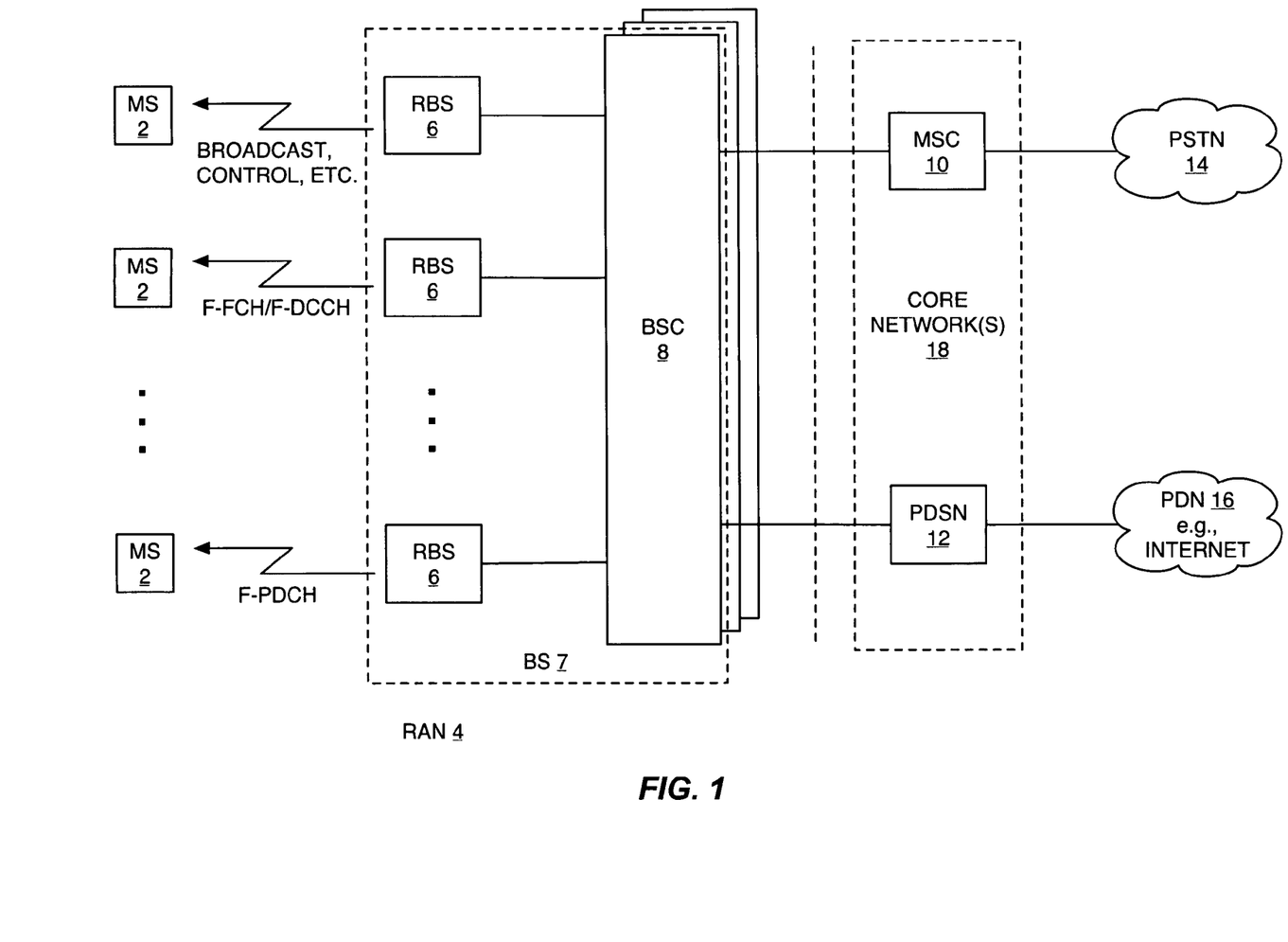
FIG. 1 illustrates one embodiment of a wireless communication system comprising core networks and a radio access network that comprises at least one base station to which mobile stations are communicatively coupled.

FIG. 1 illustrates various mobile stations 2 communicatively coupled to a radio access network (RAN) 4 that comprises at least one base station 7 and such base station 7 comprises at least one radio base station (RBS) 6 and one base station controller (BSC) 8. Regarding RBSs 6, each of them has the necessary circuitry to transmit signals to the mobile stations 2 over the air interface via various forward link radio channels such as the FCs, SCHs and PDCH(s). Regarding the BSC 8, it processes incoming calls from one or more core networks 18 that comprise (i) a mobile switching center (MSC) 10 being communicatively coupled to a public switching telephone network (PSTN) 14 and (ii) a packet data serving node (PDSN) 12 being communicatively coupled to public data network (PDN) 16 such as the Internet. When the BSC 8 receives a call from the core network(s) 18, the BSC 8 processes such call by determining which of the traffic channels such as the FCs, SCHs and PDCH(s) should be used to support the call. Thereafter, the BSC 8 allocates a Walsh code having a particular length to be used for communications between the RAN and the mobile station(s).

The length of the Walsh code allocated by the BSC 8 depends on the type of call being supported. For example, a call setup up using a FC can be supported with length-64 or length-128 Walsh codes, while a call setup using a SCH can be supported with length-128, length-64, length-32, length-16, length-8 or length-4 Walsh codes.

Figure 2:
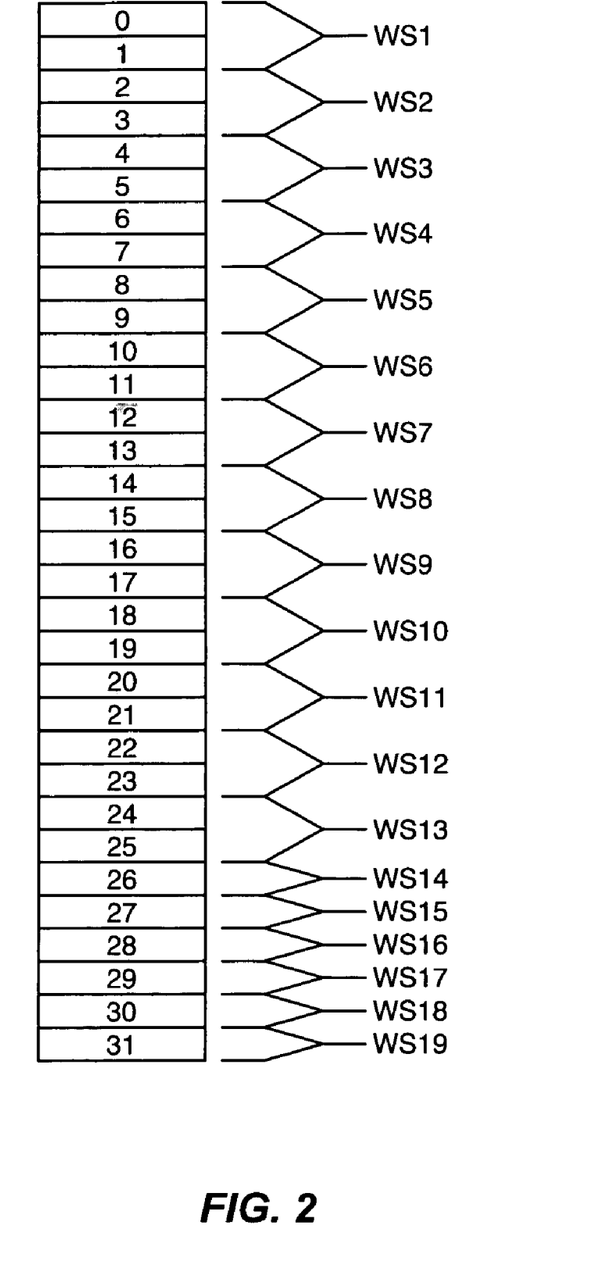
FIG. 2 illustrates Walsh spaces numerically identified from 1 to 19 corresponding to Walsh codes being included in a 1xEV-DV wireless communication network and being used to support incoming calls.

According to the 1xEV-DV standards, each "base station" has 32 length-32 Walsh codes that can be used to support various types of calls. As used herein with respect to the present invention, the term "base station" comprises a RBS, a BSC or both RBS and BSC. For example, the base station could have circuitry that resides in the RBS, the BSC or both the RBS and BSC. In addition, such circuitry comprises hardware, software or both software and software. In one embodiment of the present invention, such 32 length-32 Walsh codes are being numerically identified as Walsh spaces (WS) 1-19. Each of WS 1-13 comprises two length-32 Walsh codes while each of WS 14-19 comprises one length-32 Walsh code as illustrated in FIG. 2.

According to the 1xEV-DV standards, WS 1-15 can be used to support calls over FCs, SCHs and F-PDCH(s). WS 16-19 cannot be used to support calls over the F-PDCH but can be used to support calls over the FCs and SCHs if such WS 16-19 are not being used to support signals being transmitted over common channels such as paging, pilot and sync channels associated with IS-95 standards and such as broadcast, common control and quick paging channels associated with IS-2000 standards as illustrated in FIG. 1. Once the base station allocates Walsh codes to support calls over FCs and SCHs, the remaining Walsh codes can be used to support calls over the F-PDCH. Since calls over the F-PDCH can only be supported by length-32 Walsh codes, only the unallocated length-32 Walsh codes potentially can be used to support F-PDCH calls. In addition, their potential use to support F-PDCH calls does not require that they be contiguous.

Figure 3:
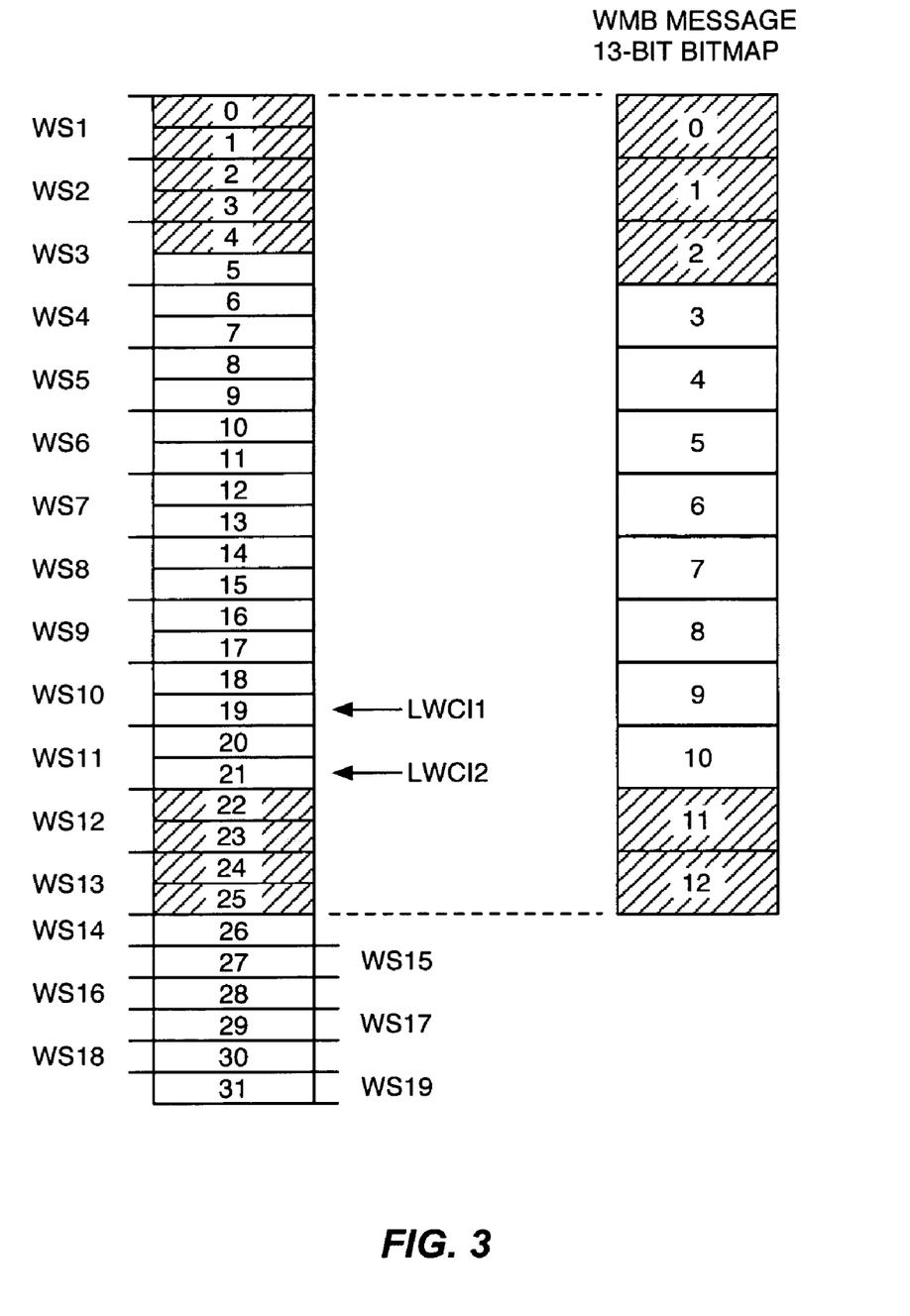
FIG. 3 illustrates which Walsh spaces of FIG. 2 are corresponded to bits of a Walsh Mask Broadcast message that the wireless communication network sends to mobile stations so as to inform such mobile stations which Walsh spaces having Walsh codes therein that are available for use for communications between the mobile stations and the networks over the F-PDCH.

In order for F-PDCH users (i.e., the mobile stations 2 sharing the F-PDCH) to know which length-32 Walsh codes are available for multi-coding their F-PDCH calls, the base station sends out a Walsh Mask Broadcast (hereinafter "WMB") message in which there are 13 bits used to indicate the availability of Walsh codes. According to the 1xEV-DV standards, each bit indicates whether a pair of length-32 Walsh codes is available. If one of the length-32 Walsh codes in a pair is not available, then such pair is not available to support F-PDCH calls. That is, both length-32 Walsh codes in a pair must be available in order for WMB message to indicate that such pair is available. Thus, the 13-bit WMB message at most could inform the mobile stations that 26 length-32 Walsh codes or 13 length-16 Walsh codes are available to support F-PDCH calls. FIG. 3 illustrates which one of the WS 1-19 corresponds to each of the 13 bits. Thus, since length-32 Walsh codes 1-4, 22 and 24-25 are already being used to support FC and SCH calls, bits 0-2 and 11-12 of the WMB message will indicate to the mobile stations that those Walsh codes associated with WS 1-3 and 12-13 cannot be used to support F-PDCH calls.

Once the mobile stations associated with F-PDCH calls receives the WMB message from the base station, each of such mobile stations then reports its respective radio conditions such as carrier-to-interference ratio (C/I) to the base station. Based on the radio conditions of each mobile, the base station selects a modulation and coding scheme (hereinafter "MCS") for the each respective mobile station and thereafter sends a message informing such mobile station regarding the selected MCS. This message also contains a Last Walsh Code Index (hereinafter "LWCI") to inform the mobile station how many 32-length Walsh codes the base station will use with the selected MCS for communications with the mobile station. More specifically, the LWCI indicates one of the length-32 Walsh codes that are available to support F-PDCH calls and the indicated length-32 Walsh code must also belong to a WS that is available to support F-PDCH calls based on the latest sent WMB message. Based on the LWCI, the mobile station knows that it should use the LWCI-indicated Walsh code and those length-32 Walsh codes that are numerically lower than or below such LWCI-indicated Walsh code for demodulating signals to be received from the base station.

For example, assuming the WMB message depicted in FIG. 3 was sent to the mobile stations, the base station thereafter could send a LWCI1 indicating any one of Walsh codes 6-21 but not Walsh codes 5 and 23 because Walsh codes 5 and 22 respectively belong to WS 3 and WS 12 that correspond to bits 2 and 11 of the WMB message and such bits 2 and 11 have indicated that the Walsh codes of WS 3 and 12 cannot be used to support F-PDCH calls. Assuming a LWCI indicating Walsh code 19 is sent to the mobile station, this indicates that the base station will use Walsh codes 6-19 for modulating and coding signals to be sent to the mobile station and such mobile station will know that it will need Walsh codes 6-19 to demodulate signals received from the base station. It should be noted that each LWCI is mobile specific. In other words, in addition to sending LWCI1 indicating Walsh code 19, the base station could send a LWCI2 indicating Walsh code 21 to another mobile station since which Walsh code indicated by the LWCI is depended on the MCS selected by the base station for a particular mobile station based on such mobile station's radio conditions.

As indicated above, the base station can transmit the WMB message and LWCI to the mobile stations so as to provide the mobile stations with updated information regarding Walsh codes availability for multi-coding the F-PDCH. If the base station needs to transmit a WMB message, 21 bits are needed for this transmission because 8 bits of the WMB message is used for Medium Access Control Identification (MAC_ID) and 13 bits of the WMB message is used for marking pairs of length-32 Walsh codes as available or unavailable for multi-coding the F-PDCH as discussed above. Thus, it is preferable to minimize the number of WMB message transmissions so as to save overhead resources.

However, saving overhead resources should be balanced against providing mobile stations with updated information regarding which Walsh codes are available to support F-PDCH calls so as to maximize the transmission rate over the F-PDCH since such rate is directly proportional to the number of Walsh codes used to multi-code the F-PDCH. Providing updated information is beneficial because as mobile users disconnect their calls from the base station more Walsh codes potentially become available to support incoming F-PDCH calls. More specifically, unless the base station informs the mobile stations by sending a WMB message regarding which Walsh codes are available based on disconnections, the base station cannot use the newly available Walsh codes for multi-coding because the mobile stations are not aware of such newly available Walsh codes and thus would not be able to demodulate the F-PDCH correctly, if the base station had added the newly available Walsh code(s) to the set of codes used for multi-coding data onto the F-PDCH.

Instead of sending out a WMB message to inform the mobile stations regarding the newly available Walsh codes, one or more embodiments of the present invention provide a Walsh codes allocation scheme that anticipates which Walsh codes that had already been allocated to support calls might be soon available for use to support incoming calls and based on such anticipation, the present invention effectively allocates Walsh codes to support incoming calls to be established over the FCs, SCHs and PDCH(s). FIGS. 4A-4G illustrate various aspects of the present invention in more details.

Figure 4A:
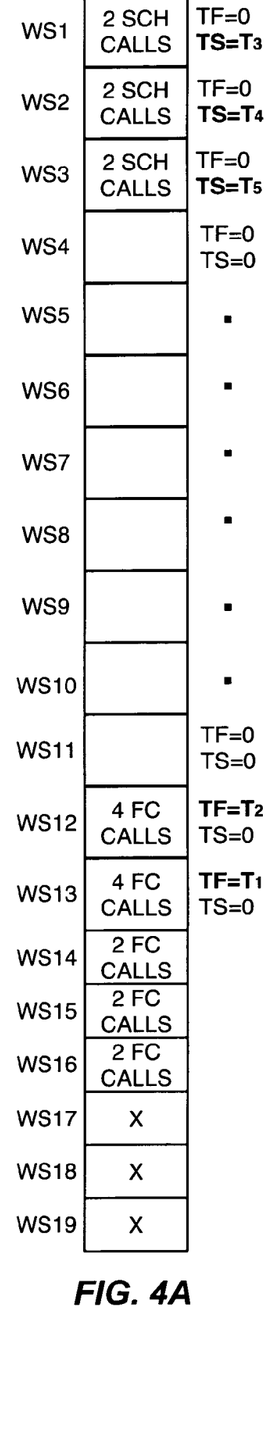
FIGS. 4A-4G illustrate how Walsh codes are allocated according to an embodiment the present invention.

Referring first to FIG. 4A, it illustrates WS 1-19 but without being labeled as such and how the Walsh codes therein are being and not being used to support calls. More specifically, WS 17-19 cannot be used to support any calls because their Walsh codes are being used to support signals being transmitted over the common channels. Thus, WS 17-19 are marked with an "X" to indicate that their Walsh codes are unavailable and cannot be used to support FC and SCH calls. As for the remaining WS 1-16, they can be used to support incoming calls and FIG. 4A shows which ones of those WS 1-16 having Walsh codes being allocated to support 20 incoming calls in accordance with the present invention.

Operationally, when the base station receives incoming calls, the base station decides which traffic channels should be used to support these calls. Calls established using FCs can be supported with length-64 or length-128 Walsh codes while calls that are established over SCHs can use length-4, length-8, length-16, lenth-32, length-64 and length-128 Walsh codes. For those calls being illustrated in FIGS. 4A-4G, FC calls are being supported with length-64 Walsh codes while SCH calls are being supported with length-32 Walsh codes.

Turning back to FIG. 4A, it illustrates how the present inventive base station selects which Walsh spaces from which Walsh codes get allocated to support the incoming 14 FC calls and 6 SCH calls. The 1xDV-EV standards prioritize FC calls higher than SCH calls and thus Walsh codes are first allocated to support FC calls and then get allocated to support SCH calls. In accordance therewith, the present invention allocates Walsh codes to support incoming FC calls by first determining which one(s) of WS 14-19 have Walsh codes available that could be used to support FC calls. WS 1-13 are not being considered at this time because the WMB message can be used to provide the mobile stations with knowledge of their availability to support incoming calls and thus it is more desirable to exhaust the Walsh codes resources of WS 14-19 before tapping into the Walsh codes resources of WS 1-13.

One reason for doing so is that once a WMB message has been sent to the mobile stations regarding the "landscape" of the available Walsh spaces being capable of supporting F-PDCH calls, it is preferable to maintain that landscape the same as long as possible because any changes to it can reduce the transmission rate over the F-PDCH until another WMB message is sent to update the mobile stations regarding any change. Thus, to support incoming FC calls, Walsh codes from WS 14-19 get allocated until such WS 14-19 no longer have any available Walsh codes. Preferably, allocation of Walsh codes from WS 14-19 begins with WS 19 and moves toward WS 14 until there are enough Walsh spaces to support incoming FC calls. Thereafter, Walsh codes from WS 1-13 get allocated. One or more embodiments of the present inventive Walsh code allocation scheme are further explained in details below.

Since WS 17-19 are unavailable, three length-32 Walsh codes from WS 14-16 are used to support 6 of the 14 incoming FC calls, each of which requires one length-64 Walsh code for support. Thereafter, the present invention selects Walsh codes from WS 1-13 to support the remaining 8 FC calls. As illustrated in FIG. 4A, Walsh codes from WS 12-13 are used to support such 8 FC calls. According to an embodiment of the present invention, if any of WS 1-13 is first used to support an incoming FC call, such WS will be marked with a time field (abbreviated as TF for FC code allocations) having a current time associated therewith. Thereafter, the TF gets updated with the current time every time such time marked WS is used support another FC call. Thus, the TF of WS 13 indicates $T_1$ while the TF of WS 12 indicates $T_2$, which is later or more current than $T_1$. Also, if none of the WS 1-13 has been time marked with a TF, allocation of Walsh codes from such WS 1-13 begins with WS 13 and moves toward WS 1 until there are enough Walsh spaces to support incoming FC calls. Once at least one of WS 1-13 has been time marked, the time marked Walsh space(s) are given higher priority than those that are not time marked. That is, Walsh codes from the time marked Walsh spaces get allocated first until such time marked WS can no longer support another FC call and then Walsh codes from those WS that have not been time marked get allocated to support incoming FC calls. The description of FIGS. 4F and 4G below further explains how Walsh codes from WS 1-13 get allocated if some of WS 1-13 are time marked TFs.

Once the Walsh codes have been allocated to support all incoming 14 FC calls, the base station then begins to allocate Walsh codes to those incoming 6 SCH calls. To do so, it selects Walsh codes from WS 1-19 by starting at WS 1 and moves toward WS 19 until there are enough Walsh spaces to support all 6 SCH calls. As illustrated in FIG. 4A, Walsh codes from WS 1-3 are used to support these 6 SCH calls. According to the present invention, if any of WS 1-13 is first used to support an incoming SCH call, such WS will be marked with a time field (abbreviated as TS for SHC code allocations) having a current time associated therewith. Thereafter, the TS gets updated with the current time every time such time marked WS is used support another SCH call. Thus, the TS of WS 1 indicates $T_3$, the TS of WS 2 indicates $T_4$ and the TS of WS 3 indicates $T_5$. Also, if none of WS 1-13 has been time marked with a TS, allocation of Walsh codes from such WS 1-13 begins with WS 1 and moves toward WS 13 until there are enough Walsh spaces to support incoming SCH calls. Once at least one of WS 1-13 has been time marked, the time marked Walsh space(s) are given higher priority than those that are not time marked. That is, Walsh codes from the time marked Walsh spaces get allocated first until such time marked WS can no longer support another SCH call and then Walsh codes from those WS that have not been time marked get allocated to support incoming SCH calls. The description of FIGS. 4D and 4E below further explains how Walsh codes from WS 1-13 get allocated if some of WS 1-13 are time marked with TSs.

Based on the above description of the present invention with respect to marking WS 1-13 with time fields TF and TS, one can see that each of WS 1-13 can have two time fields associated therewith—TF and TS. When the TF of a WS is equal to 0, this indicates that such WS has not been time marked. In other words, such WS has not been used to support any FC call. Likewise, When the TS of a WS is equal to 0, this indicates that such WS has not been time marked. In other words, such WS has not been used to support any SCH call. In addition, allocation of Walsh codes from WS 1-13 to support FC calls does take into consideration whether TFs are present but is not affected by TSs. Similarly, allocation of Walsh codes from WS 1-13 to support SCH calls does take into consideration whether TSs are present but is not affected by TFs.

Once the Walsh codes have been allocated to support all incoming FC and SCH calls, the remaining Walsh codes could be used to support calls over the F-PDCH. With respect to FIG. 4A, 16 lenth-32 Walsh codes from WS 4-11 are available to support F-PDCH calls. Assuming mobile stations associated with PDCH calls are not aware that every WS from WS 4-11 could be used to support PDCH calls, the base station could then send out a WMB broadcast message indicating so and thereafter, 6 length-32 Walsh codes from WS 4-11 could be used to support PDCH calls.

Figure 4B:
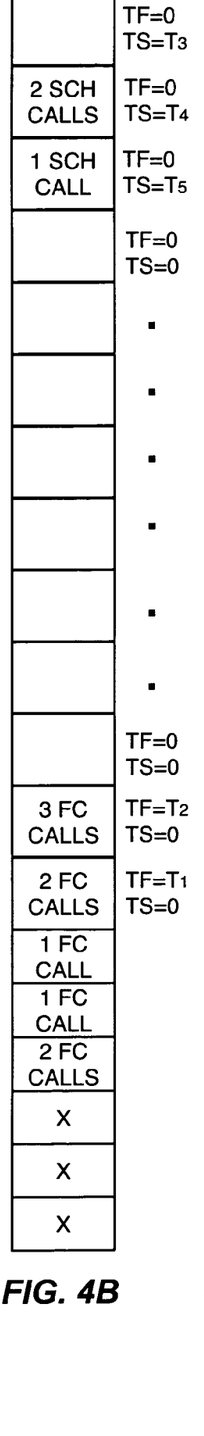

Turning to FIG. 4B, which illustrates how WS 1-19 of FIG. 1A are being used to support calls at a later time. More specifically, 5 FC and 3 SCH calls were disconnected from the base station. For example, one can see that WS 13 now supports only 2 FC calls instead of 4 FC calls. Since the time marked WS 1-3 and 12-13 have not been used to support any other calls, the time fields associated therewith remain the same. It should be noted that FIG. 4A-4E illustrate how WS 1-19 are being used to support calls on a time continuum with FIG. 4A being the earliest and FIG. 4E being the latest or most current from the time perspective.

Figure 4C:
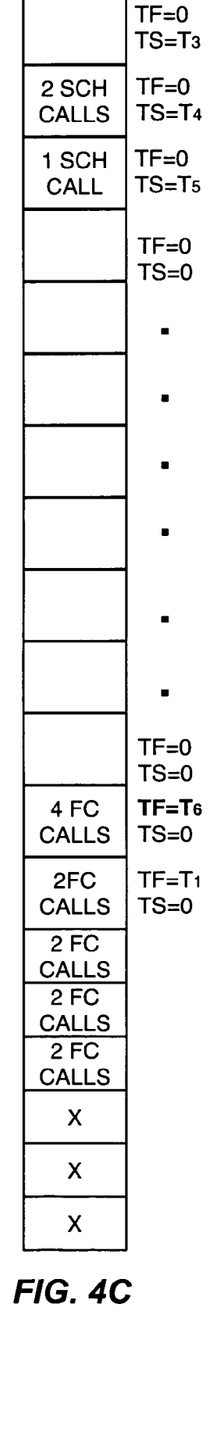

FIG. 4C illustrates that there are 3 new incoming FC calls being supported by WS 12 and 14-15. Thus, the base station, or other entity within the RAN, according to one or more embodiments of the present invention, may be configured to first determine whether WS 14-19 could be used to support these 3 new FC calls by starting at WS 19 and moving toward WS 14 until such WS 14-19 can no longer support any FC calls. By doing so, the remaining length-64 Walsh code in WS 15 is allocated to support one of the FC calls. Then, the remaining length-64 Walsh code in WS 14 is allocated to support one of the FC calls. At time WS 14-19 can no longer support any more calls and thus, allocation of Walsh codes to support the remaining incoming FC call must come from one of the WS 1-13.

Since two of such WS 1-13 have been time marked with TF, a determination must first be made to see whether they have Walsh codes available to support the remaining FC call before Walsh codes from those WS 1-11, which are not time marked with TF, get allocated. Also, since the TF associated with WS 12 has time $T_2$, which is more current than time $T_1$ as indicated by the TF associated with WS 13, any available Walsh codes in WS 12 would get used first before those of WS 13. Thus, FIG. 4C illustrates that WS 12 is used to support the remaining FC call and its TF gets updated from $T_2$ to $T_6$.

Figure 4D:
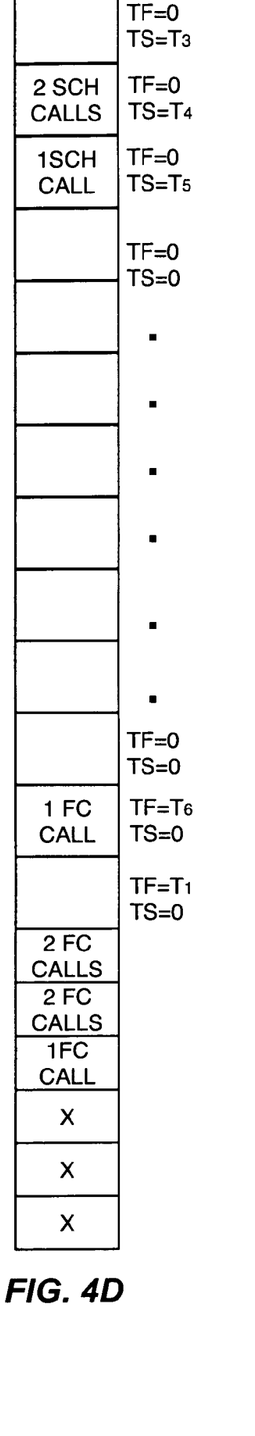

In FIG. 4D, 6 FC calls were disconnected from the base station. For example, one can see that WS 13 now supports only 1 FC call instead of 2 FC calls and that WS 13 no longer supports any FC call and thus its Walsh codes are now become available to support incoming FC calls.

Figure 4E:
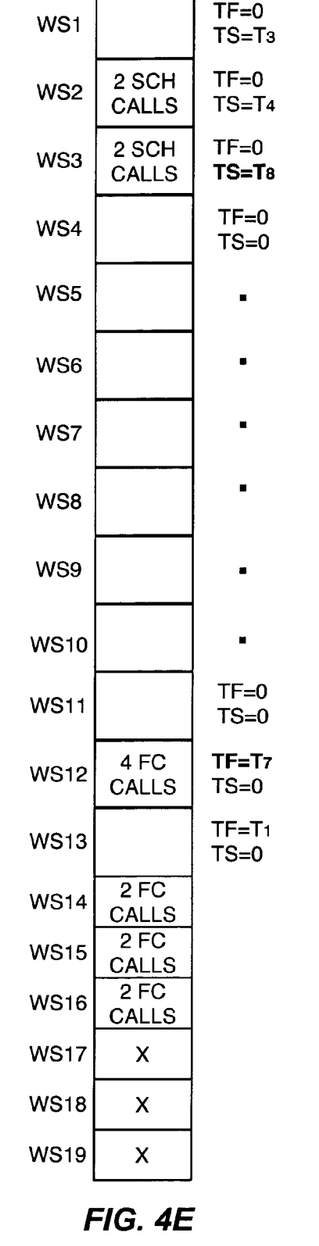

In FIG. 4E, there are 4 incoming FC calls and 1 incoming SCH call. With respect the incoming FC calls, since there is a Walsh code available from WS 14-19 such Walsh code gets allocated first to support the incoming FC calls. Thus, WS 16 now supports 2 FC calls instead of 1 FC call. As for the remaining 3 FC calls, Walsh codes from WS 12, instead of those from WS 13, get allocated to support all of them since WS 12 has the latest TF. Thereafter, the TF of WS 12 once again gets updated to $T_7$. As a result, the Walsh codes allocation scheme described herein effectively frees up WS 13 for potential use to support PDCH calls. At this time, the base station can send a WMB message to inform the mobile stations regarding the new Walsh code allocation landscape. If so, the base station also can send out a message having a LWCI therein pointing to the length-32 Walsh code 25 of the newly available WS 13. With respect to the incoming SCH call, the Walsh code from WS 3 is allocated to support such SCH call because the TS associated with WS 3 has the latest or most current time. Thereafter, the TS of WS 3 gets updated to $T_8$.

Figure 4F:
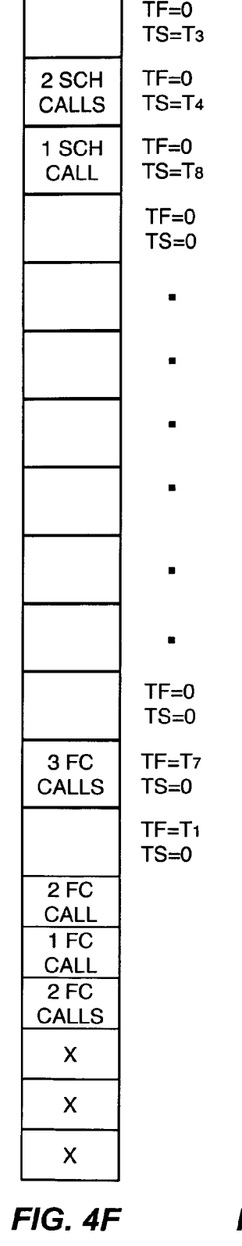

FIG. 4F illustrates that 2 FC calls and 3 SCH calls were disconnected from the base station. For example, one can see that WS 13 now supports only 1 FC call instead of 2 FC calls and that WS 13 no longer supports any FC call and thus its Walsh codes are now become available to support incoming FC calls. Since WS 1-13 are not being used to support any new incoming calls, any present TFs and TSs do not get updated.

Figure 4G:
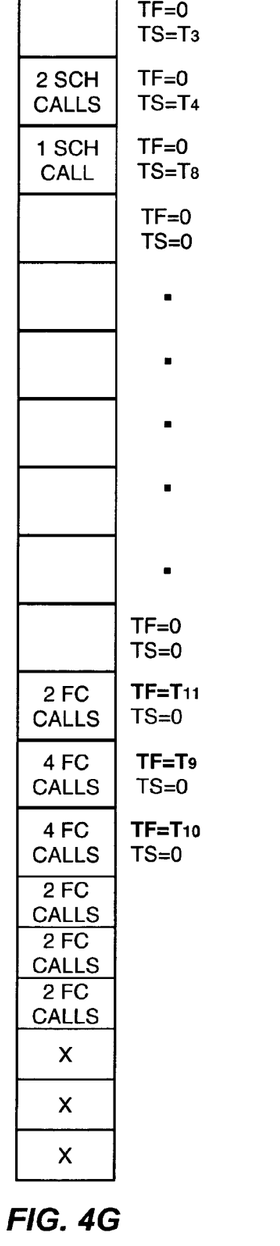

In FIG. 4E, there are 7 incoming FC calls. Walsh code from WS 15 is allocated to support 1 incoming FC call, then Walsh codes from WS 12 are allocated to support 1 incoming FC call, then Walsh codes from WS 13 are allocated to support 4 incoming FC calls and finally Walsh codes from WS 11 are allocated to support 2 incoming FC calls. It should be noted length-32 Walsh code 21 of WS 11 is allocated to support the 2 incoming FC calls since such Walsh code 21 is "higher" than Walsh code 20. Assuming that the base station has not sent out a WMB message since its last transmission after the Walsh codes had been allocated to support those calls illustrated in FIG. 4A, the base station does not need to send out another WMB because the present inventive Walsh codes allocation scheme minimizes any change to the landscape of the available Walsh codes based on the latest sent WMB that might require another WMB to be sent out. In other words, instead of allocating the Walsh codes from WS 11-13 and WS 15 as illustrated in FIG. 4G, other Walsh codes allocation scheme could have used other WS such as WS 6-7. If so, the highest length-32 Walsh code available to support PDCH calls would be Walsh code 9 of WS 5. By allocating Walsh codes as illustrated in FIG. 4G, the base station could just use the LWCI to indicate that the highest available length-32 Walsh code that could be used to support PDCH calls is Walsh code 20 instead of Walsh code 5.

Although particular embodiments of the present invention have been shown and described herein, it will be understood that it is not intended to limit the invention to the preferred embodiments and it will be obvious to those skilled in the art that various changes and modifications may be made without departing from the spirit and scope of the present invention. For example, not only can the present inventive Walsh codes allocation scheme be used to enhance 1xEV-DV wireless communication networks but it also can also be used to enhance those wireless communication networks incorporating Wideband CDMA standards, especially since such Wideband CDMA networks also comprise a time shared high-speed packet data channel known as a High Speed Downlink Packet Access (HSDPA) channel. (Note that the HSDPA in more recent literature is sometimes referred to as the "High Speed Downlink Shared Channel" or HS-DSCH.) Thus, the invention is intended to cover alternatives, modifications and equivalents, which may be included within the spirit and scope of the invention as defined by the following claims and their legal equivalents.

What is claimed is:

1. A method of allocating Walsh codes to support calls over fundicated channels (FC) and supplemental channels (SCH) in a wireless communication network, wherein a base station allocates Walsh codes from n Walsh spaces numerically identified from 1 to n and further wherein each Walsh space comprises one or more Walsh codes, the method comprising:
   if there is a first incoming call to be established over a FC:
      selecting, in the base station, a first FC Walsh space to support the first FC call from a first group of the Walsh spaces, comprising the (n-m) Walsh spaces numerically identified from (m+1) to n, wherein n and m are integers, and further wherein m<n; or
      selecting, in the base station, a first FC Walsh space to support the first FC call from the m Walsh spaces numerically identified from 1 to m if the first group of the Walsh spaces are not capable of supporting the first FC call;
      allocating, in the base station, a Walsh code in the first FC Walsh space to support the first FC call; and
      marking, in the base station, the first FC Walsh space with a first time field having a time associated therewith if the first FC Walsh space is one of the Walsh spaces numerically identified from 1 to m.

2. The method of claim 1 further comprising:
   if there is a second incoming call to be established over a FC channel:
      selecting a second FC Walsh space to support the second FC call from the first group of the Walsh spaces; or
      using the first FC Walsh space to support the second FC call if the first group of the Walsh spaces are not capable of supporting the second FC call and if the first FC Walsh space has been time marked; or
      selecting a second FC Walsh space to support the second FC call from the Walsh spaces numerically identified from 1 to m if the first group of the Walsh spaces are not capable of supporting the second FC call and if the first FC Walsh space that had been time marked is not capable of supporting the second FC call.

3. The method of claim 1, wherein each of the Walsh spaces numerically identified from 1 to m consists of two Walsh codes, further wherein each of the Walsh spaces in the first group consists of one Walsh code.

4. The method of claim 3, wherein n=19 and m=13.

5. The method of claim 1, wherein each Walsh code has a length of 32.

6. The method of claim 1 further comprising: updating the first time field with a current time if the first FC Walsh space is later used to support another call other than the first FC call.

7. The method of claim 2 further comprising:
   allocating a Walsh code in the second FC Walsh space to support the second FC call; and
   marking the second FC Walsh space with a second time field having a time associated therewith if the second Walsh space is one of the Walsh spaces numerically identified from 1 to m.

8. The method of claim 7 further comprising:
if there is a third incoming call to be established over a FC channel:
  selecting a third FC Walsh space to support the third FC call from the first group of the Walsh spaces;
  selecting one of the time marked FC Walsh spaces to support the third FC call if the first group of the Walsh spaces are not capable of supporting the third FC call, wherein the selection begins with the marked FC Walsh space having a time that is most current and moves toward the marked Walsh space having a time that is least current until there is an available marked Walsh space that is capable of supporting the third FC call; or
  selecting a third FC Walsh space to support the second FC call from the Walsh spaces numerically identified from 1 to m call if the first group of the Walsh spaces are not capable of supporting the third FC call and if each time marked Walsh space is not capable of supporting the third FC call.

9. The method of claim 1, wherein the selection of a Walsh space from the first group of the Walsh spaces begins with Walsh space n and moves toward Walsh space (m+1) until there is an available Walsh space capable of supporting the first FC call, and further wherein the selection of a Walsh space from the Walsh spaces numerically identified from 1 to m begins with Walsh space m and moves toward Walsh space 1 until there is an available Walsh space capable of supporting the first FC call.

10. The method of claim 1 further comprising:
if there is a first incoming call to be established over a SCH, selecting a first SCH Walsh space to support the first SCH call, wherein the selection moves from Walsh space 1 toward Walsh space n until there is an available Walsh space capable of supporting the first SCH call;
allocating a Walsh code in the selected first SCH Walsh space to support the first SCH call; and
marking the first SCH Walsh space with a first time field having a time associated therewith if the first SCH Walsh space is one of the Walsh spaces numerically identified from 1 to m.

11. The method of claim 10 further comprising:
if there is a second incoming call to be established over a SCH:
  using the time marked first SCH Walsh space to support the second SCH call; or
  selecting a second SCH Walsh space to support the second SCH call if the first SCH Walsh space is not capable of supporting the second SCH call, wherein the selection moves from Walsh space 1 toward Walsh space n until there is an available Walsh space capable of supporting the second SCH call; and
  allocating a Walsh code in the selected second SCH Walsh space to support the first SCH call; and
  marking the second SCH Walsh space with a second time field having a time associated therewith if the second SCH Walsh space is one of the Walsh spaces numerically identified from 1 to m.

12. The method of claim 11 further comprising:
if there is a third incoming call to be established over a SCH:
  selecting one of the time marked SCH Walsh spaces to support the third SCH call, wherein the selection begins with the marked SCH Walsh space having a time that is most current and moves toward the marked SCH Walsh space having a time that is least current until there is an available marked SCH Walsh space that is capable of supporting the third SCH call; or
  selecting a third Walsh space to support the third SCH if each time marked Walsh space is not capable of supporting the third FC call, wherein the selection moves from Walsh space 1 toward Walsh space n until there is an available Walsh space capable of supporting the second SCH call.

13. The method of claim 10 further comprising:
updating the first time field with a current time if the first SCH Walsh space is later used to support another call other than the first SCH call.

14. A method of allocating Walsh codes to support calls over fundicated channel (FC) and supplemental channel (SCH) in a wireless communication network, wherein a base station in the wireless communication network comprises n Walsh spaces identified numerically from 1 to n and further wherein each Walsh space comprises one or more Walsh codes, comprising:
  marking, in the base station, each of the m Walsh-spaces numerically identified from 1 to m with a time field having a time associated therewith if such Walsh space is first used to support a call over a FC, wherein n and m are integers, and further wherein m<n;
  updating, in the base station, the time field of each marked FC Walsh space with a current time if such FC Walsh space is later used to support another call over a FC; and
  if there is an incoming call to be established over a FC:
    selecting, in the base station, a one of the time-marked FC Walsh spaces to support the incoming FC call, wherein the selection begins with the marked FC Walsh space having a time that is most current and moves toward the marked FC Walsh space having a time that is least current until there is an available marked Walsh space that is capable of supporting the incoming FC call; and
  allocating, in the base statin, a Walsh code in the selected FC Walsh space to support the incoming FC call.

15. The method of claim 14, wherein each of the Walsh spaces 1 to m consists of two Walsh codes, further wherein each of the Walsh spaces (m+1) to n consists of one Walsh code.

16. The method of claim 15, wherein n=19 and m=13.

17. The method of claim 14, wherein each Walsh code has a length of 32.

18. The method of claim 14 further comprising:
  marking each of Walsh space numerically identified from 1 to m with a time field having a time associated therewith if such Walsh space is first used to support a call over a SCH;
  updating the time field of each marked SCH Walsh space with a current time if such SCH Walsh space is later used to support another call over a SCH; and
  if there is an incoming call to be established over a SCH:
    selecting a Walsh space to support the incoming SCH call, wherein the selection begins with the marked SCH Walsh space having a time that is most current and moves toward the marked SCH Walsh space having a time that is least current until there is an available marked Walsh space that is capable of supporting the incoming FC call; and
    allocating a Walsh code in the selected SCH Walsh space to support the incoming SCH call.

19. A base station for use in a wireless communication network being capable of supporting calls over fundicated channel (FC) and supplemental channel (SCH), wherein the base station is configured to allocate Walsh codes from n Walsh spaces identified numerically from 1 to n and further wherein each Walsh space comprises one or more Walsh codes, said base station comprising circuitry configured to:
mark each of the m Walsh spaces numerically identified from 1 to m with a time field having a time associated therewith if such Walsh space is first used to support a call over a FC, wherein n and m are integers, and further wherein m<n;
update the time field of each marked FC Walsh space with a current time if such FC Walsh space is later used to support another call over a FC; and
if there is an incoming call to be established over a FC:
select one of the time marked FC Walsh spaces to support the incoming FC call if the Walsh spaces numerically identified from (m+1) to n are not capable of supporting the incoming FC call, wherein the selection begins with the marked FC Walsh space having a time that is most current and moves toward the marked FC Walsh space having a time that is least current until there is an available marked Walsh space that is capable of supporting the incoming FC call; and
allocate a Walsh code in the selected FC Walsh space to support the incoming FC call.

20. The base station of claim 19, wherein the circuitry is further configured to:
mark each of Walsh space numerically identified from 1 to m with a time field having a time associated therewith if such Walsh space is first used to support a call over a SCH;
update the time field of each marked SCH Walsh space with a current time if such SCH Walsh space is later used to support another call over a SCH; and
if there is an incoming call to be established over a SCH:
select a Walsh space to support the incoming SCH call, wherein the selection begins with the marked SCH Walsh space having a time that is most current and moves toward the marked SCH Walsh space having a time that is least current until there is an available marked Walsh space that is capable of supporting the incoming FC call; and
allocate a Walsh code in the selected SCH Walsh space to support the incoming SCH call.

21. A method of allocating Walsh codes to support calls in a wireless communication network, wherein the Walsh codes correspond to Walsh spaces, comprising:
selecting, in a base station, a Walsh space to support each incoming call;
allocating, in the base station, Walsh codes from the selected Walsh spaces to support the incoming calls;
marking, in the base station, each selected Walsh space with a time field having a current time associated therewith, wherein for each incoming call:
a Walsh space that previously has been time marked is selected if there is a time marked Walsh space capable of supporting the incoming call; or
a Walsh space that previously has not been time marked is selected if time marked Walsh spaces are not available.

22. The method of claim 21, wherein the selection of the previously time marked Walsh space moves from the Walsh space having the most current time toward the Walsh space having the least current time until there is an available time marked Walsh space to support the incoming call.

23. The method of claim 21, wherein each selected Walsh space is marked with the time field if the selected Walsh space is first used to support a FC call, and further wherein the time field is updated with a current time each time the selected Walsh space is used to support another FC call.

* * * * *